(12) United States Patent
Haskin

(10) Patent No.: US 10,198,749 B1
(45) Date of Patent: Feb. 5, 2019

(54) PROVIDING RECOMMENDED ITEMS

(71) Applicant: Amazon Technologies, Inc., Seattle, WA (US)

(72) Inventor: Menashe Haskin, Kfar Vitkin (IL)

(73) Assignee: Amazon Technologies, Inc., Seattle, WA (US)

(*) Notice: Subject to any disclaimer, the term of this patent is extended or adjusted under 35 U.S.C. 154(b) by 638 days.

(21) Appl. No.: 14/739,552

(22) Filed: Jun. 15, 2015

(51) Int. Cl.
| | | |
|---|---|---|
| *G06Q 30/02* | (2012.01) | |
| *G06Q 10/08* | (2012.01) | |
| *G06Q 30/06* | (2012.01) | |
| *B64C 39/02* | (2006.01) | |

(52) U.S. Cl.
CPC ....... *G06Q 30/0265* (2013.01); *B64C 39/024* (2013.01); *G06Q 10/0833* (2013.01); *G06Q 10/0837* (2013.01); *G06Q 30/0255* (2013.01); *G06Q 30/0635* (2013.01); *B64C 2201/128* (2013.01); *B64C 2201/14* (2013.01)

(58) Field of Classification Search
CPC ................ G06Q 10/087; G06Q 10/08; G06Q 10/08355; G06Q 10/083; G06Q 10/0832; G06Q 10/0838; G06Q 30/0265; G06Q 10/0833; G06Q 10/0837; B64C 2201/146; B64C 39/024; G05D 1/0011; G07C 5/008; G08G 5/0069
See application file for complete search history.

(56) References Cited

U.S. PATENT DOCUMENTS

| | | | | |
|---|---|---|---|---|
| 8,266,017 B1* | 9/2012 | Dearlove | ............... | G06Q 30/02 705/26.7 |
| 9,305,280 B1* | 4/2016 | Berg | ..................... | G08G 5/0069 |
| 2010/0250336 A1* | 9/2010 | Selinger | ................ | G06Q 30/02 705/26.7 |
| 2011/0320376 A1* | 12/2011 | Dearlove | ............... | G06Q 10/08 705/337 |
| 2012/0072364 A1* | 3/2012 | Ho | ........................ | G06Q 10/047 705/338 |
| 2015/0154559 A1* | 6/2015 | Barbush | ........... | G06Q 10/08355 705/338 |
| 2015/0161667 A1* | 6/2015 | Stevens | .............. | G06Q 30/0264 705/14.23 |
| 2015/0178676 A1* | 6/2015 | Carr | .................... | G06Q 10/0836 705/332 |
| 2015/0193724 A1* | 7/2015 | Stevens | ................ | G06Q 10/083 705/330 |
| 2015/0262121 A1* | 9/2015 | Riel-Dalpe | ............ | G06Q 10/08 705/15 |
| 2016/0125508 A1* | 5/2016 | Carr | .................... | G06Q 30/0635 705/26.7 |
| 2016/0307449 A1* | 10/2016 | Gordon | ................ | G08G 5/0069 |
| 2017/0011333 A1* | 1/2017 | Greiner | ................ | G06Q 10/083 |

* cited by examiner

*Primary Examiner* — Florian M Zeender
*Assistant Examiner* — Milena Racic
(74) *Attorney, Agent, or Firm* — Kilpatrick Townsend & Stockton LLP

(57) ABSTRACT

Techniques for providing a number of items may be described. For example, a request for a delivery of an item within a time frame may be received. An additional item may be determined based at least in part on the item and the time frame. Both items may be scheduled for delivery based at least in part on the time frame. Information associated with the items and including an option to accept a delivery of the additional item may be provided. If the option may have been selected, a delivery of the additional item may be caused.

20 Claims, 10 Drawing Sheets

PROVIDING RECOMMENDED ITEMS

BACKGROUND

More and more users are turning to network-based resources, such as electronic marketplaces, to purchase items (e.g., goods and/or services). A network-based resource may provide a user experience unmatched by a more traditional brick and mortar store. For example, the network-based resource may offer a larger and more diverse selection of items. Further, for some of the items, there may be a number of sellers with different offers. As such, a customer may not only have access to a rich item selection, but may also obtain items at the most convenient offers.

A user, such as a customer, may operate a computing device to access a network-based resource and request information about an item. The network-based resource may provide the information and information about various available delivery methods. In turn, the user may purchase the item from the network-based resource, select a delivery method, and specify a delivery location. The item may be accordingly shipped to the delivery location.

BRIEF DESCRIPTION OF THE DRAWINGS

Various embodiments in accordance with the present disclosure will be described with reference to the drawings, in which.

DETAILED DESCRIPTION

Figure 1:
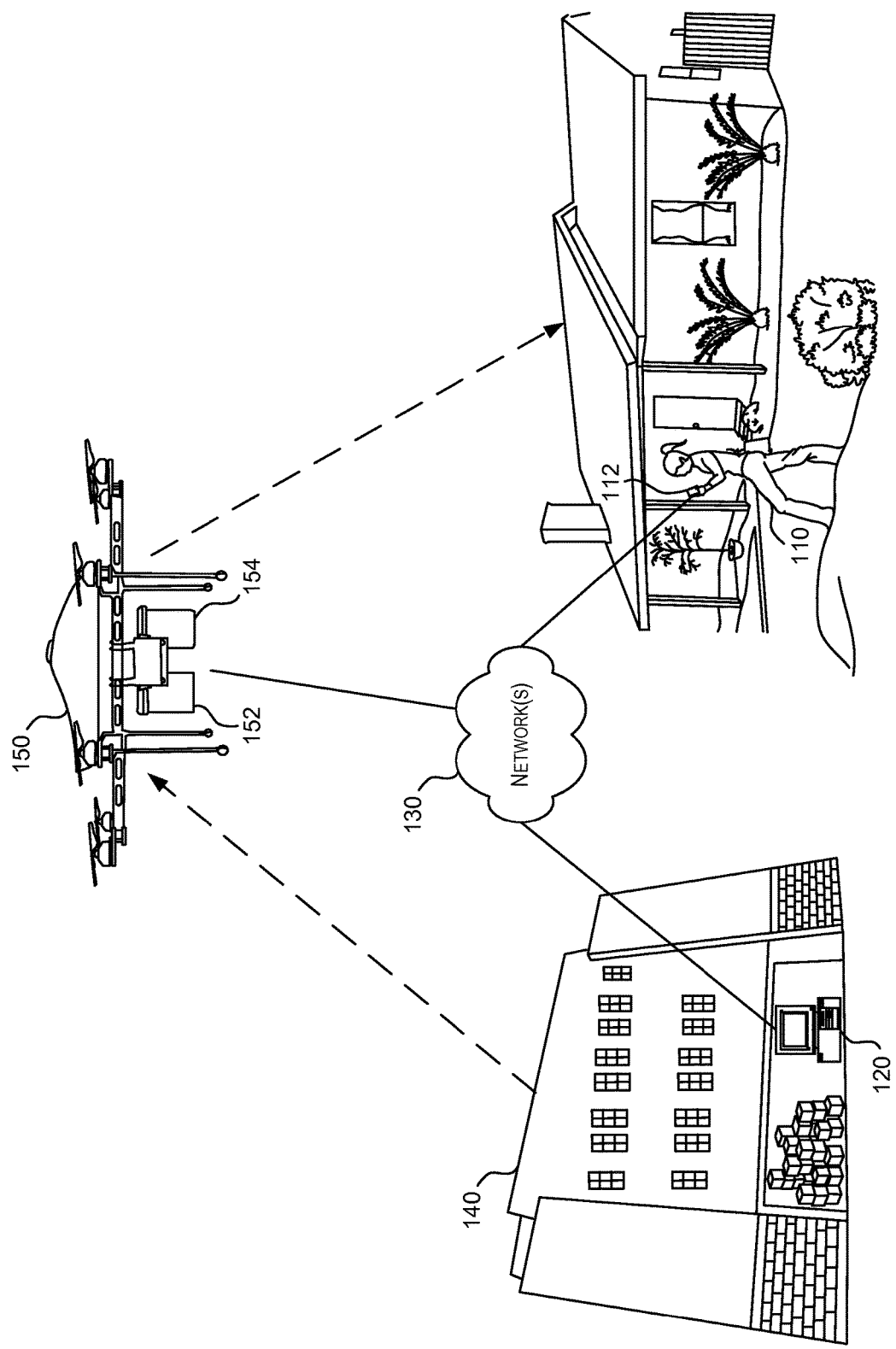
FIG. 1 illustrates an example environment for delivering an ordered item and a recommended item, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing recommended items. Providing a recommended item may include delivering the recommended item. In particular, a network-based resource may list a number of available items and a number of available delivery methods. In turn, a user may operate a computing device to access the network-based resource, order an item, and select a delivery method. Based on the ordered item and the selected delivery method, a user's interest in other available items may be gauged. Accordingly, a recommended item may be identified. The ordered item and the recommended item may be shipped to a delivery location associated with the user. Information about the shipment may be provided to the same or a different computing device of the user. The information may indicate that the recommended item may have also been shipped and provide the user with an option to order and/or decline the recommended item. If ordered, the recommended item may be delivered to the delivery location. Otherwise, the recommended item may be returned.

To illustrate, consider an example of an electronic marketplace. A customer may access the electronic marketplace and order an item, such as a toothbrush. The customer may also select a fast delivery method, such as one that may deliver the item to the customer's home within a next hour or so (relative to the time of the order) using an unmanned aerial vehicle (UAV). Given that the item may be a toothbrush and given the speediness of the selected delivery method, urgency behind the order may be sensed. This urgency may indicate that the customer may have an immediate need for the item and may be eagerly waiting home for the delivery. Accordingly, a recommendation for an additional item may be made. The recommended item may have a usage that may complement the usage of the ordered item and that may be associated with the customer's need. For example, the recommended item may include toothpaste. The two items (e.g., the toothbrush and toothpaste) may be shipped to the customer's home using the UAV. Once shipped, a notification may be sent indicating that both items were shipped and providing an option to order the recommended item. Upon review of the notification, the user may order the recommended item. Indication of this order may be sent to the UAV causing the UAV to dispense both items at the delivery location.

The above example is provided for illustrative purposes only and does not limit the embodiments described herein. Other techniques may be used to recommend, ship, and/or deliver one or more additional items. For instance, a technique implementing an opportunistic approach may be used. This technique may increase a likelihood of conversion (e.g., customers ordering recommended items that may have already been shipped) and/or optimize usage of a fleet of UAVs (e.g., by reducing unused delivery space of the UAVs and/or by increasing an overall amount of completed deliveries). For instance, if a UAV is deployed on a mission to deliver an item and has free space, a recommended item may be selected based on the free space and added to the UAV as a part of the delivery mission. These and other techniques are further described herein below.

In the interest of clarity of explanation, the embodiments may be described herein in the context of one or more UAVs delivering an item ordered from a network-based resource and a recommended item available from the network-based resource. However, the embodiments are not limited as such. Instead, the embodiments may similarly apply to items available from different sources, and/or a delivery of a larger number of items. Any of the items may be ordered, purchased, provided, requested, and/or returned. Further, the embodiments may similarly apply to other delivery methods that may use other types of delivery vehicles including aerial, ground, and/or water-based vehicles. Generally, based on a request for a delivery of an item, an additional item may be determined. This additional item may be scheduled for delivery in association with the requested delivery. Information about the additional item may be provided and may include information for confirming, accepting, declining, ordering, canceling, stopping, and/or returning the additional item or the delivery thereof.

Turning to FIG. 1, an example environment for delivering an ordered (or requested) item and a recommended item is illustrated. In particular, a user 110 corresponding to a user account may operate a computing device 112 to access a network-based resource, such as a web site, hosted on a computing system 120 of a service provider. The computing system 120 may include a number of servers and/or other computing resources. The access may be remote over a network 130. The network-based resource may be associated with an electronic marketplace configured to offer items and facilitate transactions involving the items. The transactions may include, for example, ordering items and selecting different available delivery methods. The user 110 may accordingly order an item, select a delivery method, and specify a delivery location 114. In an example, the user 110 may select a delivery method usable to deliver the order item within a time frame. That time frame may be short, such as within an hour or so of placing the item order. To support such a short time frame, the service provider may manage a fleet of UAVs configured to execute different types of missions, including delivery missions. A management component, hosted on the computing system 120 or another computing system, may be configured to manage the UAV fleet.

Based on the ordered (i.e., requested) item and the selected delivery method, a recommendation component may determine an item that may be recommended to the user 110 and/or the user account. The computing system 120, or another computing system, may host the recommendation component. An example flow for determining the recommended item is further illustrated in FIG. 8. Briefly, the recommended item may represent an item that may be of interest to the user and/or that may meet one or more constraints associated with a delivery thereof.

Accordingly, the ordered item and the recommended item may be shipped to the user 110 from a facility 140 using the selected delivery method. For example, a deployment component, hosted on the computing system 120 or another computing system, may deploy a UAV 150 to deliver the two items (and potentially other items). The deployment component may operate in conjunction with or independently of the management component. The facility 140 may represent a source that may store, stock, supply, and/or collect the items, along with other items available for ordering from the electronic marketplace. For example, the facility 140 may represent a warehouse.

As illustrated, the two items may be packaged separately and shipped. For example, the ordered item may be packaged in package 152, while the recommended item may be packaged in package 154. The two packages 152 and 154 may be retained separately by the UAV 150 (e.g., in different compartments of the UAV 150). Because of the short time frame, the UAV 150 may be deployed to initiate the delivery of packages 150 and 152 (e.g., of the two items) prior to notifying the user 110 or receiving an order of the user for the recommended item. Instead, the notification may be made and/or order may be received post the delivery initiation.

In particular, the notification about the shipment may be provided in association with deploying the UAV 150. For example, a notification component, hosted on the computing system 120 or another computing system, may send the notification to the user's computing device 112. The notification may provide information about the recommended item and an option to order, accept, and/or decline the recommended item. An example notification is further illustrated in FIG. 2.

The selection of the option may be received by the notification component and provided to the management component. In turn, the management component may provide information about the selection to the UAV 150. The UAV 150 may accordingly deliver the packages 152 and 154 to the delivery location 114. For example, if the user 110 ordered or accepted the recommended item, the package 154 may be delivered. Otherwise, the UAV 150 may retain the package 154 and return to the facility 140, or to some other location, without delivering the recommended item. If ordered, an account of the user may be charged for the recommended item and/or for the delivery thereof.

The above example is illustrative. The embodiments herein include other variations. For example, how the items may be packaged and shipped, the number of used UAVs, the number of used facilities, the delivery method, and/or the notification type and method may vary. The next paragraphs describe some but not all of these variations.

In particular, different techniques may be used to package and ship the items. In one technique, the two items may be packaged separately, as described herein above. The resulting packages may be retained by a same retaining mechanism of a UAV (e.g., the packages may be added to a same compartment of the UAV). Alternatively, the packages may be retained by different retaining mechanisms of the UAV (e.g., added to two different compartments of the UAV). Further, the packaging of an item may be used to return the item. Alternatively, another return package may also be shipped with the two items. In another technique, rather than separate packaging, the items may be packaged together in a same package. In addition, the two items may be shipped along with other items using the same UAV, where these other items may be delivered to the same user or to other users.

In another example, one or more UAVs may be used. If a single UAV is used, as illustrated in FIG. 1, the UAV may include one or more retaining mechanisms to retain the items (e.g., the packages). Additionally or alternatively, more than one UAV may be used. For example, one UAV may be used to ship and deliver the ordered item, while another UAV may be used to ship and deliver (or return) the recommended item. Each of these two UAVs may further retain other items (ordered or recommended) for delivery to (or return from) a same user or other users. When multiple UAVs are used, the UAVs may be scheduled to arrive and/or deliver items at the delivery location 114 within a time interval of each other. For example, the UAV retaining the ordered item may deliver this item within the short time frame of the selected delivery method. The other UAV retaining the recommended item may deliver the recommended item within also the short time frame (e.g., before, concurrently with, or after the delivery of the ordered item) or shortly after that time frame may have elapsed (e.g., within a predefined fraction of the time frame).

In an example, a UAV fleet may be managed in a region associated with the delivery location 114. The region may represent a neighborhood, zip code, city, and/or other region-based resolution that may include the delivery location 114. The UAV fleet may be managed to deliver recommended items only. In other words, the UAV fleet may represent a delivery mechanism for quickly dispatching and delivering recommended items. Alternatively, the UAV fleet may be managed to deliver items (ordered and recommended) from a facility local to that region.

In yet another example, more than one facility may be used. As illustrated in FIG. 1, both items may be shipped from the same facility 140. In another example, the ordered item may be shipped from the facility 140, while the recommended item may be shipped from another facility. This other facility may be local to the region associated with the delivery location. Further, the other facility may specifically be used to store recommendable items determined based on a history of past item orders within the region.

Furthermore, notifications about shipments and recommended items may be facilitated through the computing system 120. For example, the computing system 120 may be used as an intermediary computing node between the UAV 150 and the user's computing device 112. In other words, the computing system 120 may facilitate a data exchange between the UAV 150 and the user's computing device 112. As such, the computing system 120 may provide the user's computing device 112 with updates about the location of the UAV 150, an expected arrival time, an/or delivery-related information. In addition, the computing system 120 may receive the selection of the option to order the recommended item from the user's computing device and provide instructions to the UAV 150 to deliver the recommended item.

In another example, communication between the UAV 150 and the user's computing device 112 may be direct (e.g., point-to-point rather than through the computing system 120). For example, the UAV 150 and the user's computing device 112 may communicate directly over the network 130 or over a local network between the two. The local network may include a data communication network that may implement a data exchange protocol, such as one established using a WiFi or Bluetooth technologies. The local network may also be of a different type. For example, the UAV 150 may include a voice synthesizer, an imaging sensor, an audio sensor, and a motion sensor. The UAV may use voice synthesizer to provide various information to the user 110 (e.g., to audibly request whether the user 110 would like to order the recommended item, or to confirm a selection of the user 110). Based on various motions, gestures, and/or voice commands of the user 110, the UAV 150 may identify a command from the user 110 (e.g., to deliver the recommended item). Regardless of the technology used to facilitate the direct communication, information associated with the user 110 and received by the UAV 150 (e.g., an order of the recommended item) may be transmitted from the UAV 150 over the network 130 or some other network to the computing system 120. Similarly, information associated with the UAV 150 and provided to the user's computing device 112 may be transmitted from this device to the computing system 120.

In addition, the UAV 150 may perform various maneuvers to deliver the recommended item. Some of these maneuvers may depend on the packaging of the items and/or the used retaining mechanism(s) of the UAV 150. For example, if the items are retained separately, the UAV 150 may deliver the ordered item and, further, deliver the recommended item only if an order for the recommended item is received from the user's computing device 112. In another example, the UAV 150 may deliver both items regardless of whether the order for the recommended item may have been received or not. In this example, if the user 110 rejects the recommended item, this item may be returned in a return package using one or more different return vehicles. These return vehicles may include, for example the UAV 150, and may be used to pick up and return the recommended item to the facility 140 or to another facility.

When delivering one or both items, the UAV 150 may implement various security techniques to ensure a proper delivery. For example, the UAV 150 may authenticate the user. For instance, the UAV 150 may use imaging sensor to capture an image of the user and compare the image to one available from the user's account. In another example, the UAV 150 may communicate with the user's computing device 112 to provide an authentication interface (e.g., a web page that may require a user login). In yet another example, the UAV 150 may authenticate the delivery. For instance, the UAV 150 may request an identifier of the delivery. This identifier may be a code, such as serial number unique to the delivery, provided in a prior notification to the user. If the proper identifier is provided (e.g., via the user's computing device 112), the UAV 150 may proceed with the delivery.

Hence, various techniques may be used to deliver an ordered item and a recommended item to a user. Generally, based on the ordered item and a time frame associated with a selected delivery method, the recommended item may be selected and shipped even before an order of the user for the recommended item. Thus, both items may arrive to a delivery location simultaneously, at short intervals of each other, and/or within the time frame.

Figure 2:
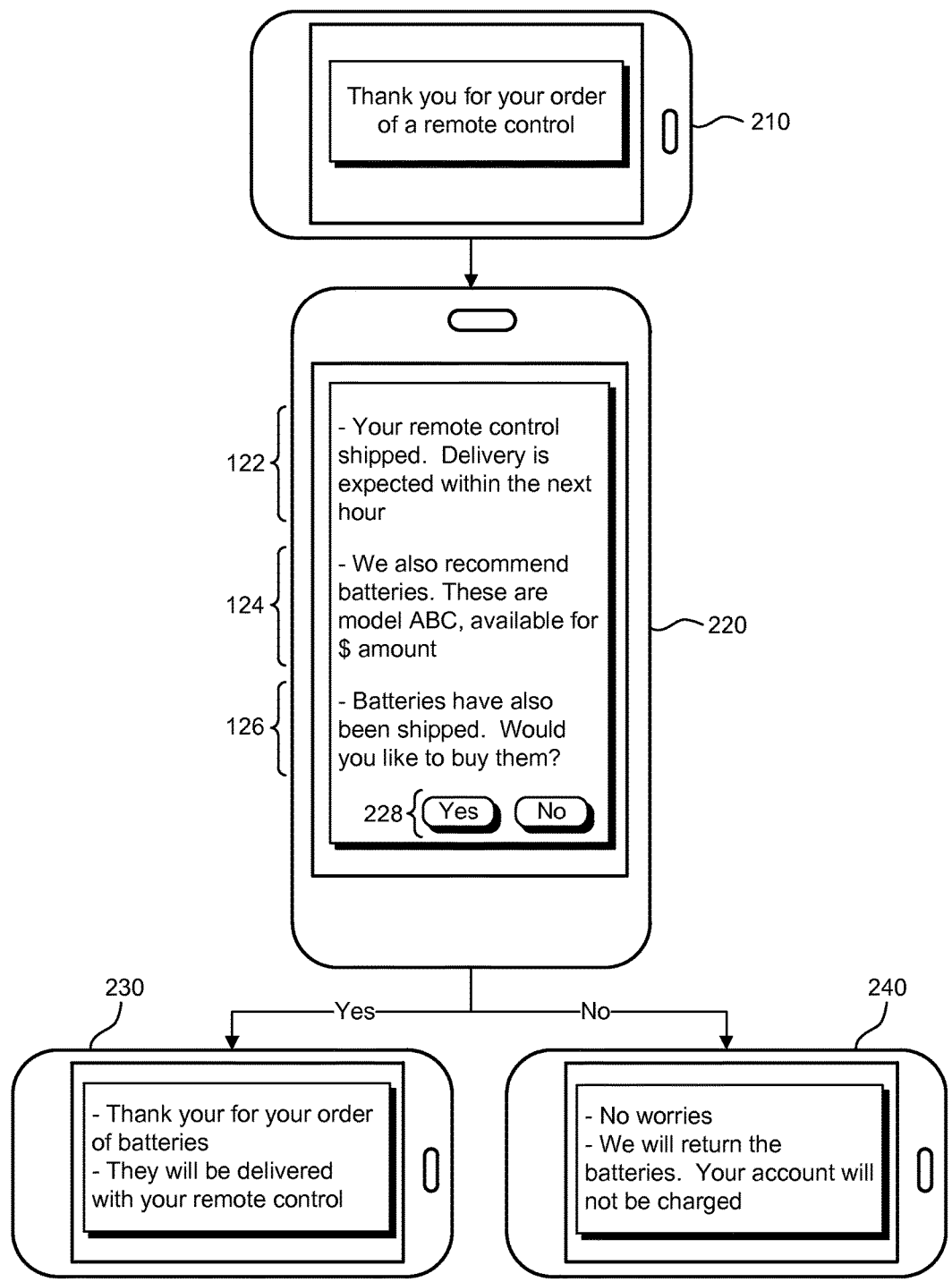
FIG. 2 illustrates an example interface configured to provide information about an ordered item and a recommended item, according to embodiments.

As described herein above, the recommended item may be shipped prior to an actual order from the user. A notification may be accordingly provided to the user with information about the recommended item and about an option to order or reject the recommended item. FIG. 2 illustrates example notifications. The notifications may be presented at an interface of the user's computing device, such as at a browser running on the device. Other types of notification may also be used, such as audible text messages, emails, posts, user account updates, and/or audible messages. Generally, a notification may provide information that may be relevant to an ordered item and/or to a recommended item. The frequency of notifications may vary and may be defined by the user or a service provider.

As illustrated in FIG. 2, a first notification 210 may be provided. The notification 210 may inform the user about an ordered item. For example, the notification 210 may be provided as a part of the user ordering the item from a network-based resource and may represent a confirmation of the order.

A second notification 220 may be provided to update the user about shipment 222 of the ordered item. This second notification 220 may also include information 224 about a recommended item. For example, the information 224 may identify the recommended item and a respective price. The notification 220 may also include an indication 226 that the recommended item may have been shipped along with the ordered item. The notification may further provide the user with one or more options 228 to order or reject the recommended item.

Similar notifications about the ordered item and the recommended item may be provided to the user at time intervals or based on various trigger events. For example, upon arrival of a UAV retaining the items to a delivery location, a notification may be provided informing the user of the arrival and, if the recommended item has not been ordered yet, of the option to do so.

If a user selection indicates an order of the recommended item, a notification 230 may be provided. This notification 230 may inform the user that the recommended item may have been ordered and provide information about an expected delivery. On the other hand, if the user selection indicates that the recommended item may have been rejected, a notification 240 may be provided. This notification 240 may inform the user that the recommended item may have been rejected and that the user's account would not be charged for a cost associated with the recommended item.

Hence, the notifications may keep the user informed about the shipment and may serve as reminders to order or reject the recommended item. Some or each of the notifications may also include additional information. For example, information about the number of deployed UAVs, identifier(s) of the deployed UAV(s), and/or estimated arrival time(s) may be provided. If a code is used to authenticate the delivery, such a code may also be provided in a notification.

Figure 3:
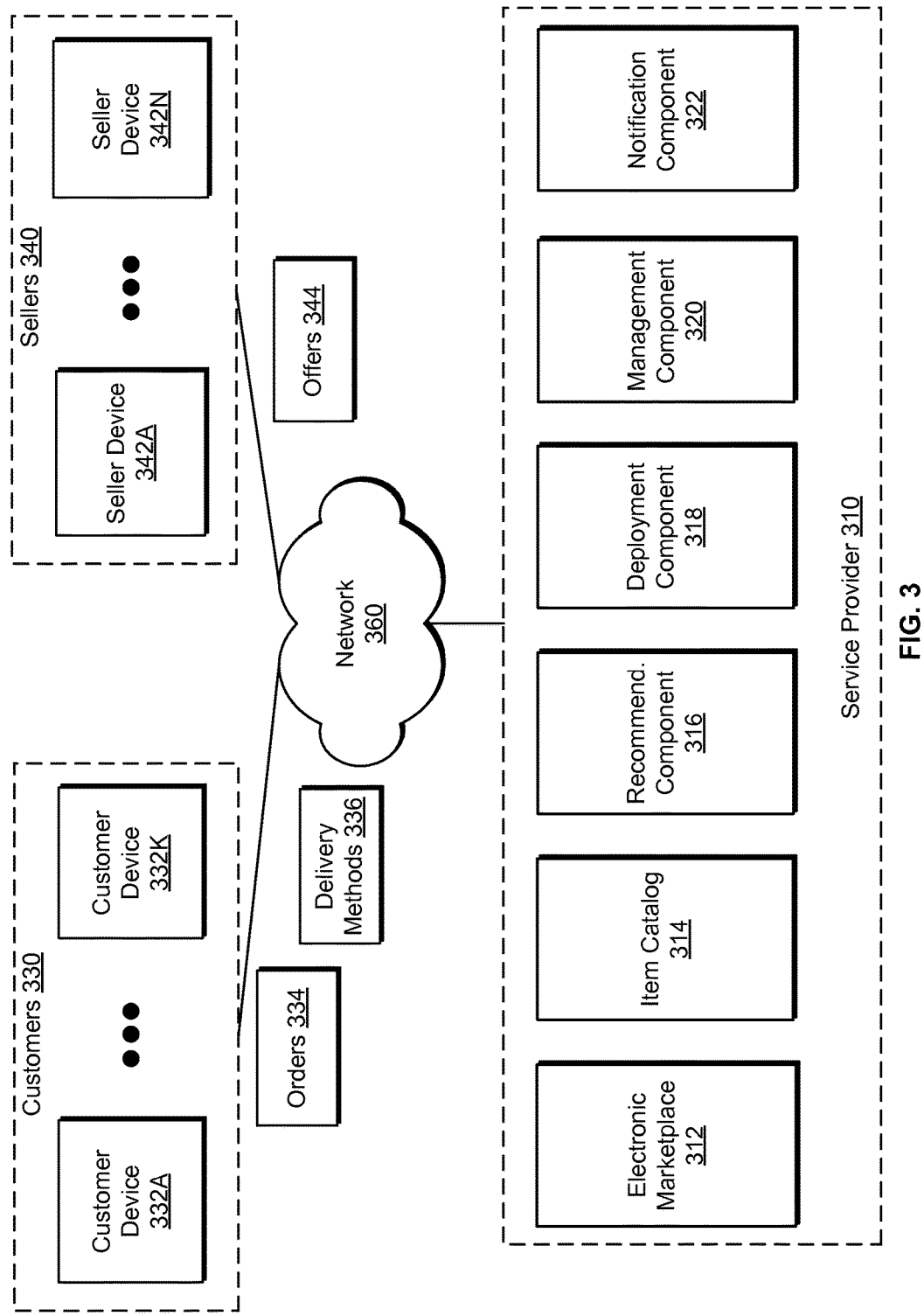
FIG. 3 illustrates an example environment for offering items, according to embodiments.

Turning to FIG. 3, a computing environment for implementing some of the above-described features within the context of an electronic marketplace is illustrated. In particular, a service provider 310 of an electronic marketplace 312 may implement a plurality of components to facilitate a delivery of an ordered item and of a recommended item. Each of the components may be implemented, in part or in full, on a same or different computing system of the service provider 310. Further, some all of these components may interface with each other or may be integrated as a single component. A delivery component may represent these components, whether integrated or implemented separately and/or whether hosted on one or more computing systems.

In particular, the electronic marketplace 312 may be configured to offer different items. In an example, a network-based resource, such as a web site, may be configured to facilitate access to the electronic marketplace 312. The network-based resource may, for example, provide access to information about offered items and available delivery methods and facilitate orders for these items and selections of delivery methods. The network-based resource and/or other components of an electronic platform may maintain information about the items, the respective offers, selected delivery methods, conducted transactions, and/or other operations of the electronic marketplace 312. For example, the offered items may be cataloged in an item catalog 314. Available delivery methods to deliver a cataloged item may also be maintained in the item catalog 314. The item catalog 314 may represent a data structure maintaining the information about the items.

A network-based document (e.g., a web page, a detail page, etc.) of the electronic marketplace 312 may be associated with an item. The network-based document may use information from the item catalog 314. In an example, the network-based document may allow sellers 340 and/or the service provider 310 to define offers of items and delivery methods. For instance, the sellers 340 may list offers 344. The provided information may be added to the item catalog 314. The service provider 310 and/or the sellers may also list the associated delivery methods. The network-based document may also allow customers 330 to review the information available from the item catalog 314 (e.g., offers of the item and delivery methods) and make an order or purchase decision. The customers 330 may, for example, review the information, place orders 334 for the item, and select respective delivery methods 336.

The delivery component may include a recommendation component 316. The recommendation component 316 may be configured to recommend a number of items to be shipped with an ordered item based on the ordered item and the selected delivery method. For example, the recommendation component 316 may maintain associations between items based on past item orders. These associations may identify items that may have been ordered together. As such, if an item may have been frequently purchased with the ordered item, this item may become a candidate item for recommendation. The recommendation 316 may further analyze various parameters or constraints associated with the selected delivery method to identify a recommended item from candidate items.

The delivery component may also include a deployment component 318. The deployment system 318 may be configured to select one or more UAVs to deploy on a mission for delivering an item and an associated recommended item. The selection of a UAV may be based on the availability and capability of the UAV relative to the delivery mission. The deployment component 318 may facilitate deploying the UAV(s), tracking the respective operations, and providing status information.

Further, the delivery component may also include a management component 320. The management component 320 may be configured to provide data to a UAV prior or post deployment to provide different management functions including supporting, directing, managing, and/or controlling operations of the UAV. The data may include coordinate locations of a delivery location, a flight path, a code for a delivery, and/or other data to facilitate the delivery of items. In one example, the management may be minimal to allow autonomous operations of the UAV. In another example, the management may be more involved and may allow semi-autonomous operations of the UAV or may represent full control over such operations.

In addition, the delivery component may also include a notification component 322. The notification component 322 may be configured to generate and provide notifications to a computing device of customer. A notification may inform a customer about an item and a recommended item and may provide an option to order the recommended item.

As such, the service provider 310 may operate the electronic marketplace 312 to facilitate interactions between the service provider 310, the customers 330, and the sellers 340 over a network 360. Each one of the sellers 340 may operate one or more seller devices 342A-N to access the electronic marketplace 312 and perform various seller-related functions. A customer may be an item recipient, a buyer, or any user reviewing, browsing, ordering, obtaining, purchasing, or returning an item of a seller. Each one of the customers 330 may operate one or more customer devices 332A-K to access the electronic marketplace 312 and perform various customer-related functions. Once an order of an item may be received from a customer, the delivery component may be used to select a recommended item and to deploy and manage, in part or in full, a number of UAVs to deliver the ordered recommended items to a location associated with the customer.

Figure 4:
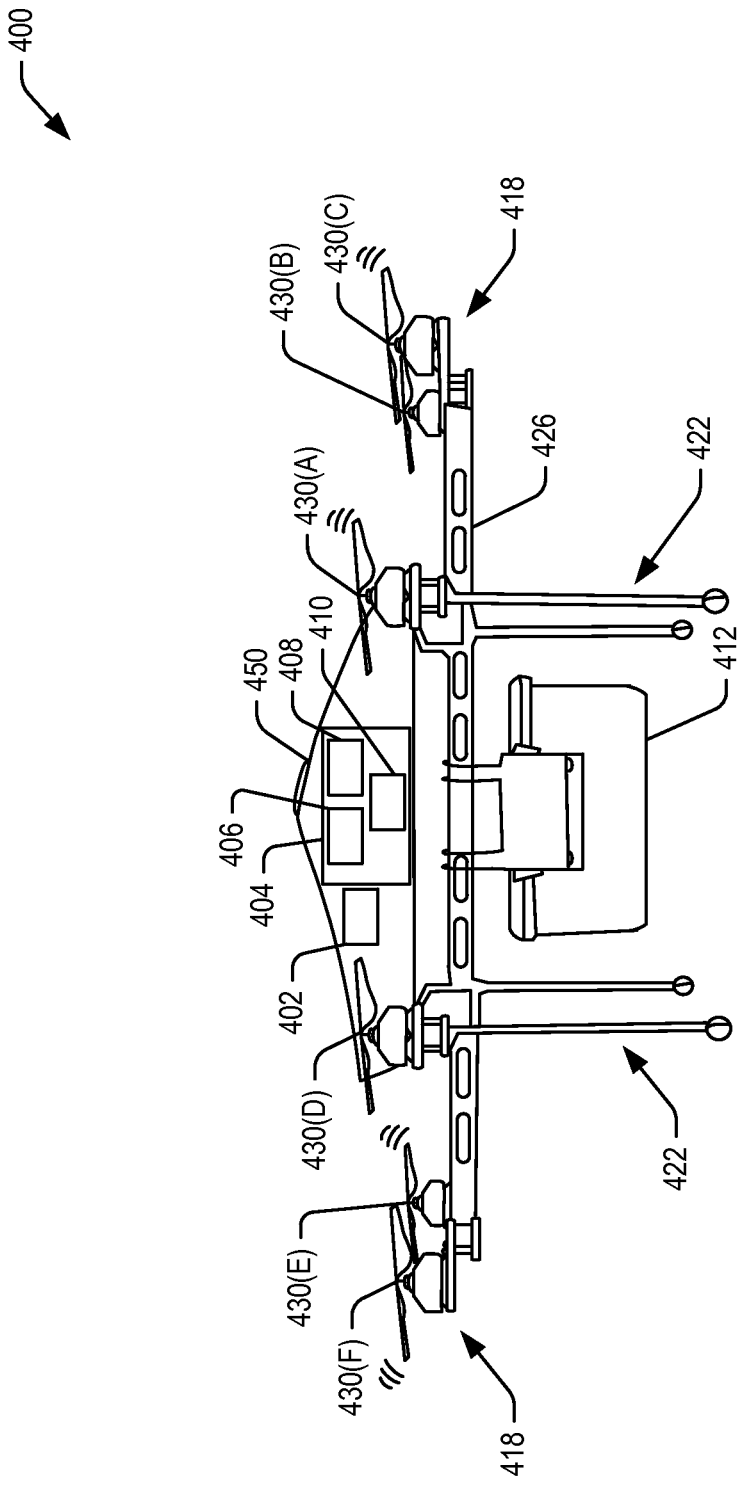
FIG. 4 illustrates an example aerial vehicle configured to deliver items, according to embodiments.

An ordered item and a recommended item may be delivered using various types of delivery vehicles. FIG. 4 illustrates an example UAV 40 configured to deliver the items. The UAV 400 may be designed in accordance with commercial aviation standards and may include multiple redundancies to ensure reliability. In particular, the UAV 400 may include a plurality of systems or subsystems operating under the control of, or at least partly under the control of, a management component 402. The management component 402 may be configured to mechanically and/or electronically manage and/or control various operations of other components of the UAV 400. For example, the management component 402 may include various sensing, activating, and monitoring mechanisms to manage and control the various operations. For instance, the management component 402 may include or interface with an onboard computing system 404 hosting a management module for autonomously or semi-autonomously controlling and managing various operations of the UAV 400 and, in some examples, for enabling remote control by a pilot. The various operations may also include managing other components of the UAV 400, such as a propulsion system 418 to facilitate flights and a retaining system 412 to facilitate holding and/or releasing a number of packages (e.g., items). Portions of the management component 402, including mechanical and/or electronic control mechanisms may be housed under the top cover 450 or distributed within other components such as the retaining mechanism 412. In a further example, components remote from the UAV 400 may be used, such as components of the delivery components described in connection with FIG. 3, and may be in communication with the management component 402 to direct some or all of the operations of the management component 402. In an example, the management component 402 may include a power supply and assemblies (e.g., rechargeable battery, liquid fuel, and other power supplies), one or more communications links and antennas (e.g., modem, radio, network, cellular, satellite, and other links for receiving and/or transmitting information), one or more navigation devices and antennas (e.g., global positioning system (GPS), inertial navigation system (INS), range finder, Radio Detection And Ranging (RADAR), a voice synthesizer, sensors (e.g., imaging, audio, motion, and/or other sensors), and other systems to aid in navigating the UAV 400, detecting objects, and/or delivering items.

The UAV 400 may also include the onboard computing system 404. In an example, the computing system 404 may be integrated with the management component 402. In another example, the computing system 404 may be separate from but may interface with the management component 402. The computing system 404 may be configured to provide an electronic control of various operations of the UAV 400, including the ones provided by the management module. In an example, the computing system 404 may also process sensed data by one or more other components of the UAV, such as the management component 400, to generate data associated with delivering items. In a further example, the computing system 404 may also electronically control components of the retaining mechanism 412. As illustrated in FIG. 4, the computing system 404 may be housed within the top cover 450 and may include a number of components, such as a computer 406, a storage device 408, and an interface 410. The computer 406 may host the management module configured to provide management operations of the flight and/or other portions of a mission of the UAV 400. For example, the data management module may generate the data associated with the delivery of the items and direct operations of the retaining mechanism 412 to release one or more of the items. The storage device 408 may represent one or more storage media, such as a volatile or non-volatile semiconductor, magnetic, or optical storage media. In an example, the storage device 408 may be configured to store operational data of the UAV 400 and the data associated with the delivery. The interface 410 may represent an interface for exchanging data as part of managing and/or controlling some of the operations of the UAV 410. In an example, the interface 410 may be configured to facilitate data exchanges with the management component 402, other components of the UAV 400, and/or other components remote from the UAV 400. As such, the interface 410 may include high-speed interfaces, wired and/or wireless, serial and/or parallel, to enable fast upload and download of data to and from the computing system 404.

As shown in FIG. 4, the UAV 400 may also include the retaining mechanism 412. The retaining mechanism 412 may be configured to retain a number of packages and to selectively release one or more of the packages. In some examples, the retaining mechanism 412 may retain a package using friction, vacuum suction, opposing arms, magnets, holding, and/or other retaining mechanisms. As illustrated in FIG. 4, the retaining mechanism 412 may include a compartment configured to contain a package. In another example, the retaining mechanism 412 may include opposing arms configured to apply friction to a package. The management component 402 may be configured to control at least a portion of the retaining mechanism 412. For example, the management component 402 may electronically and/or mechanically activate the retaining mechanism 412 to hold and/or release a package. In an example, the package may be released from the retaining mechanism 412 by opening the compartment, pushing the package, moving one or both of the opposing arms, and/or stopping an application of friction, vacuum suction, and/or magnetic force. If the UAV 400 remains airborne when a package is released, various techniques may be used to deliver the package to a delivery surface. For example, a cable may be used to lower the package. For example, the retaining mechanism 412 may include a winch and/or a spool.

The retaining mechanism 312 may retain and/or release more than one package. For example, the compartment may be sized to hold multiple packages. Alternatively, multiple compartments may be fitted to the UAV 400. Additionally, the UAV 400 may include a plurality of retaining mechanisms, each of which may be configured to retain and release one or more packages.

Further, the UAV 400 may include a propulsion system 418. In some examples, the propulsion system 418 may include rotary blades or otherwise be a propeller-based system. As illustrated in FIG. 4, the propulsion system 418 may include a plurality of propulsion devices, a few of which, 430(A)-230(F), are shown in this view. Each propeller device may include one propeller, a motor, wiring, a balance system, a control mechanism, and other features to enable flight. In some examples, the propulsion system 418 may operate at least partially under the control of the management component 402. In some examples, the propulsion system 418 may be configured to adjust itself without receiving instructions from the management component 402. Thus, the propulsion system 418 may operate semi-autonomously or autonomously.

The UAV 400 may also include landing structure 422. The landing structure 422 may be adequately rigid to support the UAV 400 and the package. The landing structure 422 may include a plurality of elongated legs that may enable the UAV 400 to land on and take off from a variety of different surfaces. The plurality of systems, subsystems, and structures of the UAV 400 may be connected via frame 426. The frame 426 may be constructed of a rigid material and be capable of receiving via different connections the variety of systems, sub-systems, and structures. For example, the landing structure 422 may be disposed below the frame 426 and, in some examples, may be formed from the same material and/or same piece of material as the frame 426. The propulsion system 418 may be disposed radially around a perimeter of the frame 426 or otherwise distributed around the frame 426. In some examples, the frame 426 may attach or be associated with one or more fixed wings.

Figure 5:
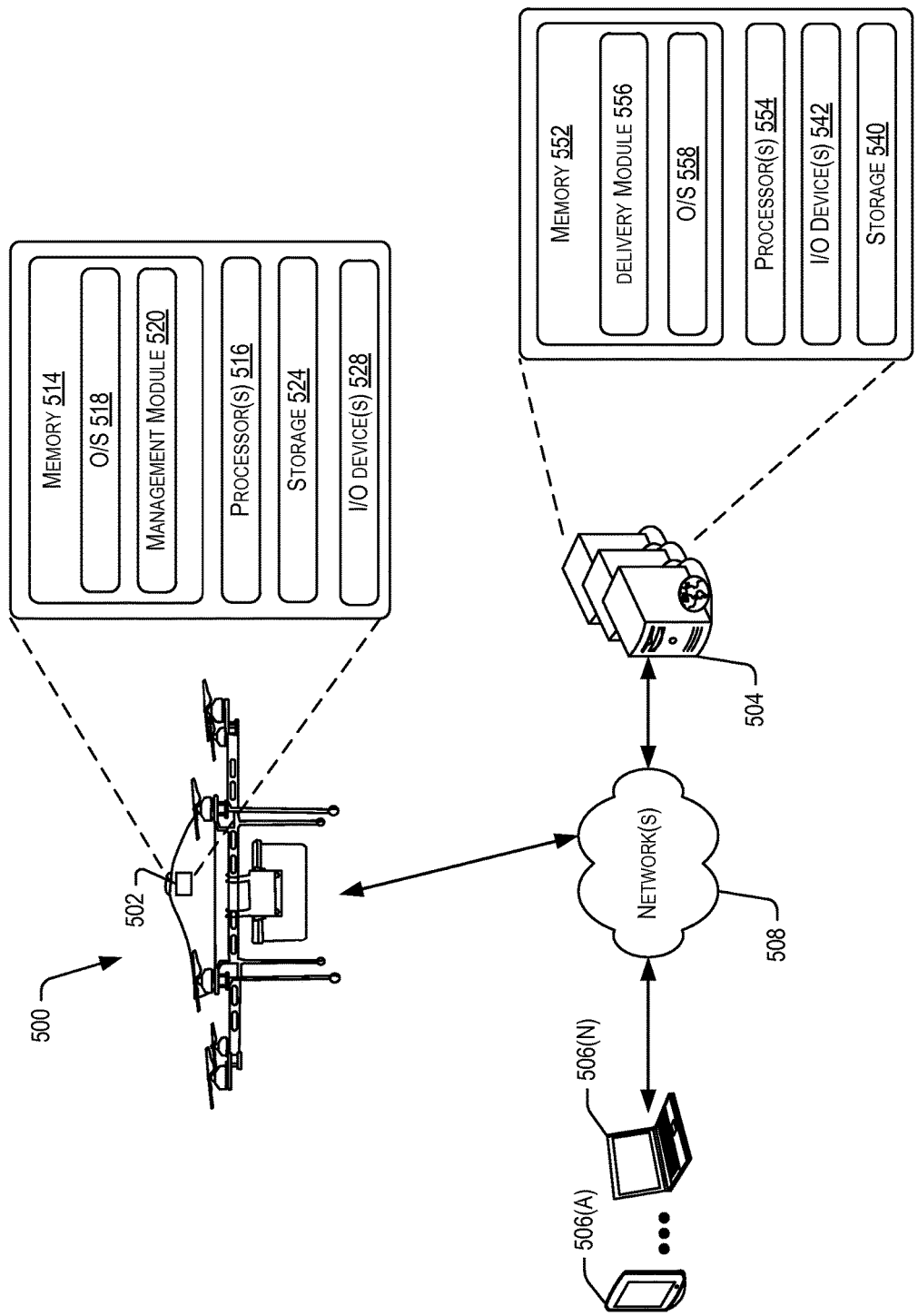
FIG. 5 illustrates an example computing architecture for offering and delivering items, according to embodiments.

Turning next to FIG. 5, an example computing architecture configured to facilitate a delivery of an ordered item and a recommended item is illustrated. The architecture may include a UAV 500, a server 504, customers 506(A)-(N) (which may be referred to herein as a customer 506 or customers 506), and a network 508. Generally, the architecture may be implemented as part of an electronic marketplace offering items. For example, the server 504 may be in communication with the UAV 500 to facilitate a delivery of an item ordered from the electronic marketplace. This communication may occur over the network 508. The network 508 may include any one or a combination of many different types of networks, such as wireless networks, cable networks, cellular networks, radio networks, the Internet, and other private and/or public networks.

The customer 506 may represent a user computing device operated by a user to order an item, order a recommended item, and/or reject a recommended item. For example, the customer 506 may be any suitable device capable of communicating with the server 504 over the network 508. Generally, the customer 506 may be any suitable computing device such as, but not limited to, a mobile phone, a smart phone, a personal digital assistant (PDA), a laptop computer, a thin-client device, a tablet, a desktop computer, a set-top box, or other computing device. More particularly, the customer 506 may include a memory, a processor, a user-interface, a web-service application, and any other suitable feature. The web service application may be in the form of a web browser, an application programming interface (API), virtual computing instance, or other suitable application. In an example, the customer 506 may but need not be the recipient of the requested data.

In an example, the customer 506 may connect to the server 504 over the network 508 to order an item and receive notifications. In addition, the customer 506 may connect to the server 504 and/or the UAV 500 over the network 508 or another network to order or reject a recommended item.

Turning now to the details of the server 504, the server 504 may include one or more service provider computers, such as servers and other suitable computing devices, configured to offer various data services to users. The server 504 may be configured to host a web site (or combination of web sites) accessible to customers. The web site may be accessible via a web browser and may enable a customer to place an order for an item and select a delivery method.

In embodiments, the server 504 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the server 504 may include one or more servers, perhaps arranged in a cluster, or as individual servers not associated with one another.

In one illustrative configuration, the server 504 may include at least one memory 532 and one or more processing units (or processor(s)) 534. The processor(s) 534 may be implemented as appropriate in hardware, computer-executable instructions, software, firmware, or combinations thereof. Computer-executable instruction, software, or firmware implementations of the processor(s) 534 may include computer-executable or machine-executable instructions written in any suitable programming language to perform the various functions described. The memory 532 may include more than one memory and may be distributed throughout a plurality of a network of servers. The memory 532 may store program instructions (e.g., a delivery module 536) that are loadable and executable on the processor(s) 534, as well as data generated during the execution of these programs. Depending on the configuration and type of memory, the memory 532 may be volatile (such as random access memory (RAM)) and/or non-volatile (such as read-only memory (ROM), flash memory, or other memory).

The server 504 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 532 may include multiple different types of memory, such as static random access memory (SRAM), dynamic random access memory (DRAM), or ROM.

Turning to the contents of the memory 532 in more detail, the memory 532 may include an operating system 538 and one or more application programs, modules or services for implementing the features disclosed herein including at least a delivery module 536. The delivery module 536 may implement functionalities of the delivery component described in connection with FIG. 3. For example, the delivery module 536 may be configured to select a recommended item, select and deploy a UAV, facilitate or manage execution of a delivery mission by the UAV, and/or provide associated notifications.

In some examples, the server 504 may also include additional storage 540, which may include removable storage and/or non-removable storage. The additional storage 540 may include, but is not limited to, magnetic storage, optical disks, and/or tape storage. The disk drives and their associated computer-readable media may provide non-volatile storage of computer-readable instructions, data structures, program modules, and other data for the computing devices.

The memory 532 and the additional storage 540, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors). The modules of the server 504 may include one or more components. The server 504 may also include I/O device(s) and/or ports 542, such as for enabling connection with a keyboard, a mouse, a pen, a voice input device, a touch input device, a display, speakers, a printer, or other I/O device.

Turning now to the details of the UAV 500, the UAV 500 may include some or all of the components of the UAV 400 described in connection with FIG. 4. In an illustrative embodiment, the UAV 500 may include a management component implemented, in part or in full, by computing system 502 similar to the computing system 404 of FIG. 4. The computing system 502 may include at least one memory 514 and one or more processing units (or processor(s)) 516. The processor(s) 516 may be implemented as appropriate in hardware, computer-executable instructions, software, firmware, or combinations thereof. Computer-executable instruction, software, or firmware implementations of the processor(s) 516 may include computer-executable or machine-executable instructions written in any suitable programming language to perform the various functions described. The memory 514 may include more than one memory and may be distributed throughout the computing system 502.

The memory 514 may store program instructions (e.g., a management module 520) that are loadable and executable on the processor(s) 516, as well as data generated during the execution of these programs. Depending on the configuration and type of memory, the memory 514 may be volatile (such as random access memory (RAM)) and/or non-volatile (such as read-only memory (ROM), flash memory, or other memory).

The computing system 502 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 514 may include multiple different types of memory, such as static random access memory (SRAM), dynamic random access memory (DRAM), or ROM.

In some examples, the computing system 502 may also include additional storage 522, which may include removable storage and/or non-removable storage. The additional storage 522 may include, but is not limited to, magnetic storage, optical disks, and/or tape storage. The disk drives and their associated computer-readable media may provide non-volatile storage of computer-readable instructions, data structures, program modules, and other data for the computing devices.

The memory 514 and the additional storage 522, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. The modules of the computing system 502 may include one or more components.

Turning to the contents of the memory 514 in more detail, the memory 514 may include an operating system 518 and one or more application programs, modules or services for implementing the features disclosed herein including at least a management module 520. The management module 520 may be configured to provide flight operation management functions and/or to manage operations of different components to deliver an item at a delivery location. In an example, the management module 520 may operate autonomously or independently of the delivery module 536 of the server 504. In another example, the management module 520 may operate semi-autonomously or be fully controlled by the delivery module 536.

The computing system 502 may also include I/O device(s) 526 (e.g., interfaces, ports) such as for enabling connection with the server 504. The I/O device(s) 526 may also enable communication with the other components and systems of the UAV 500 (e.g., a propulsion system and a retaining mechanism).

Figure 6:
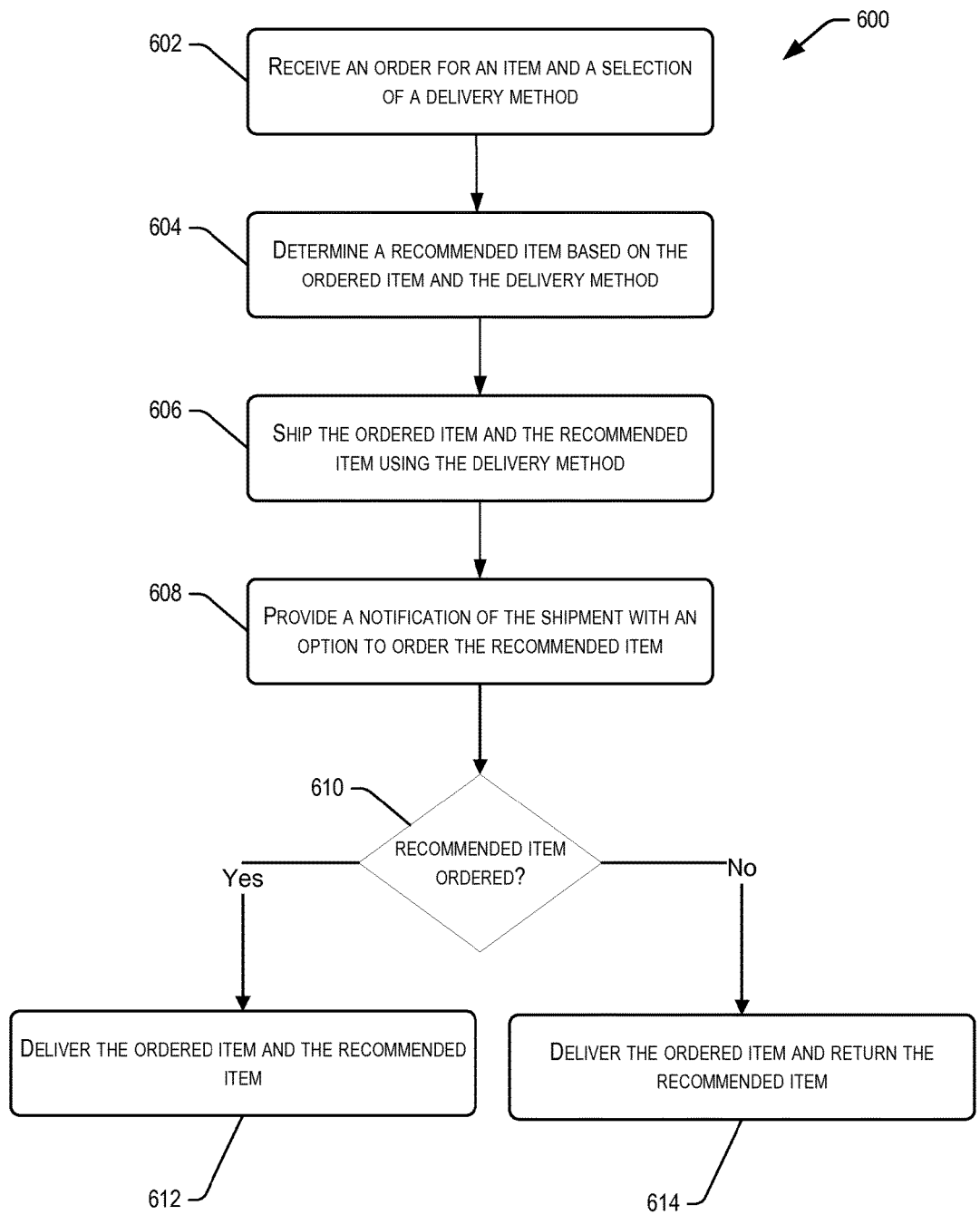
FIG. 6 illustrates an example flow for delivering items, according to embodiments.
Figure 7:
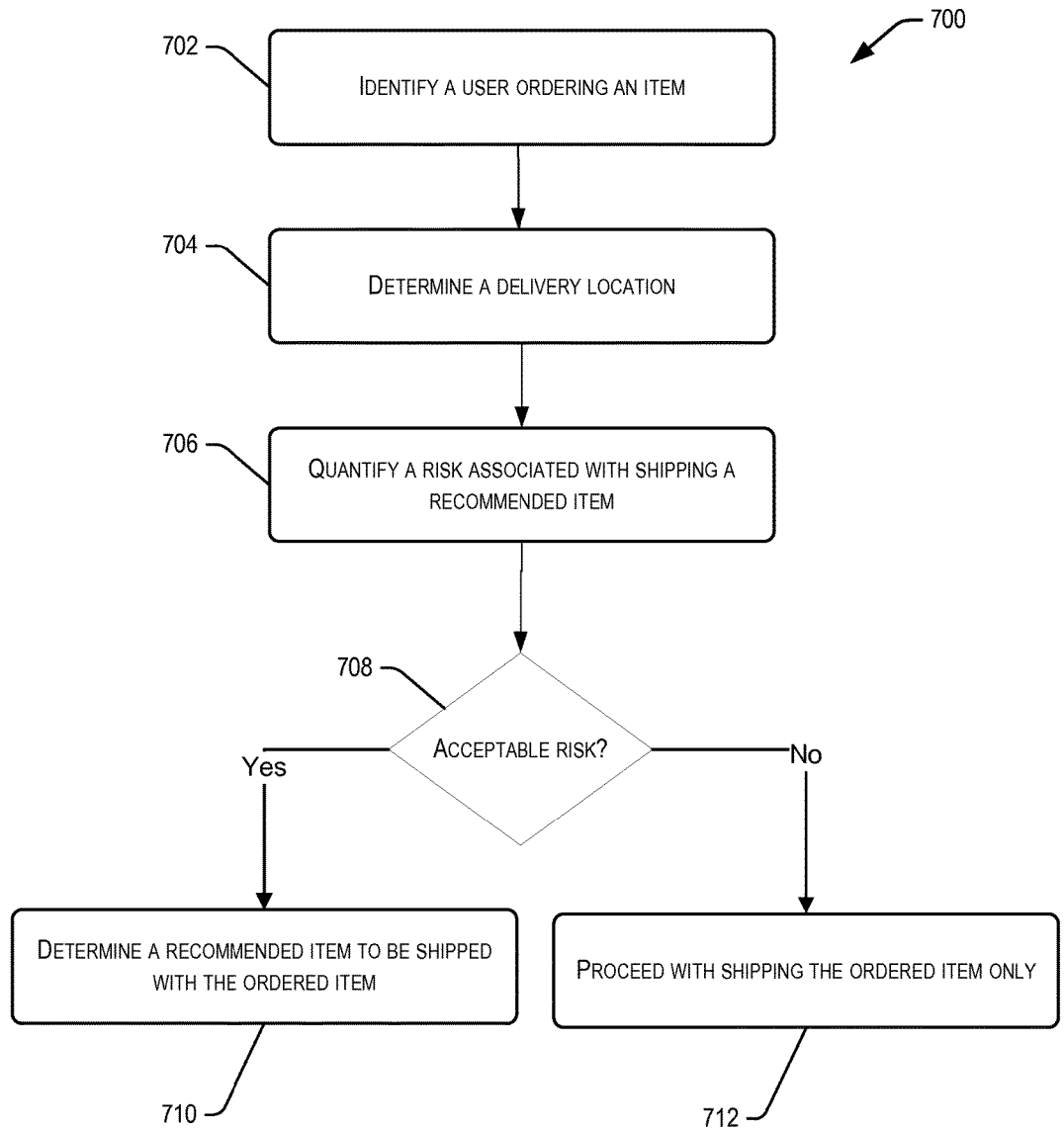
FIG. 7 illustrates an example flow for determining whether to deliver a recommended item, according to embodiments.
Figure 8:
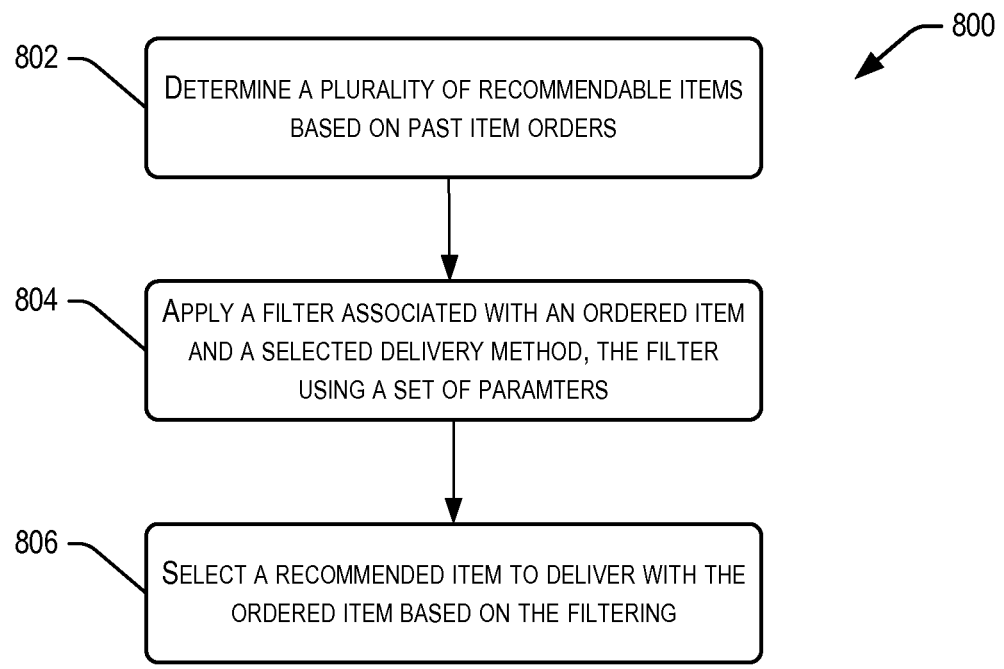
FIG. 8 illustrates an example flow for selecting a recommended item, according to embodiments.
Figure 9:
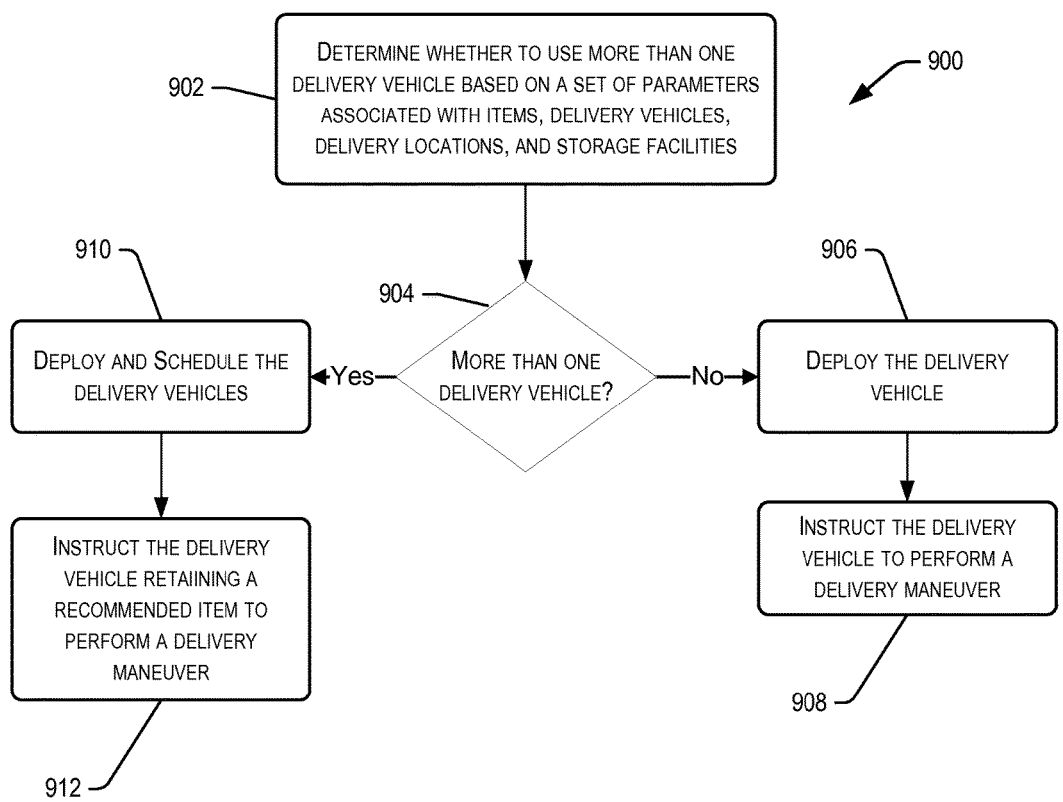
FIG. 9 illustrates an example flow for deploying one or more delivery vehicles, according to embodiments.
Figure 10:
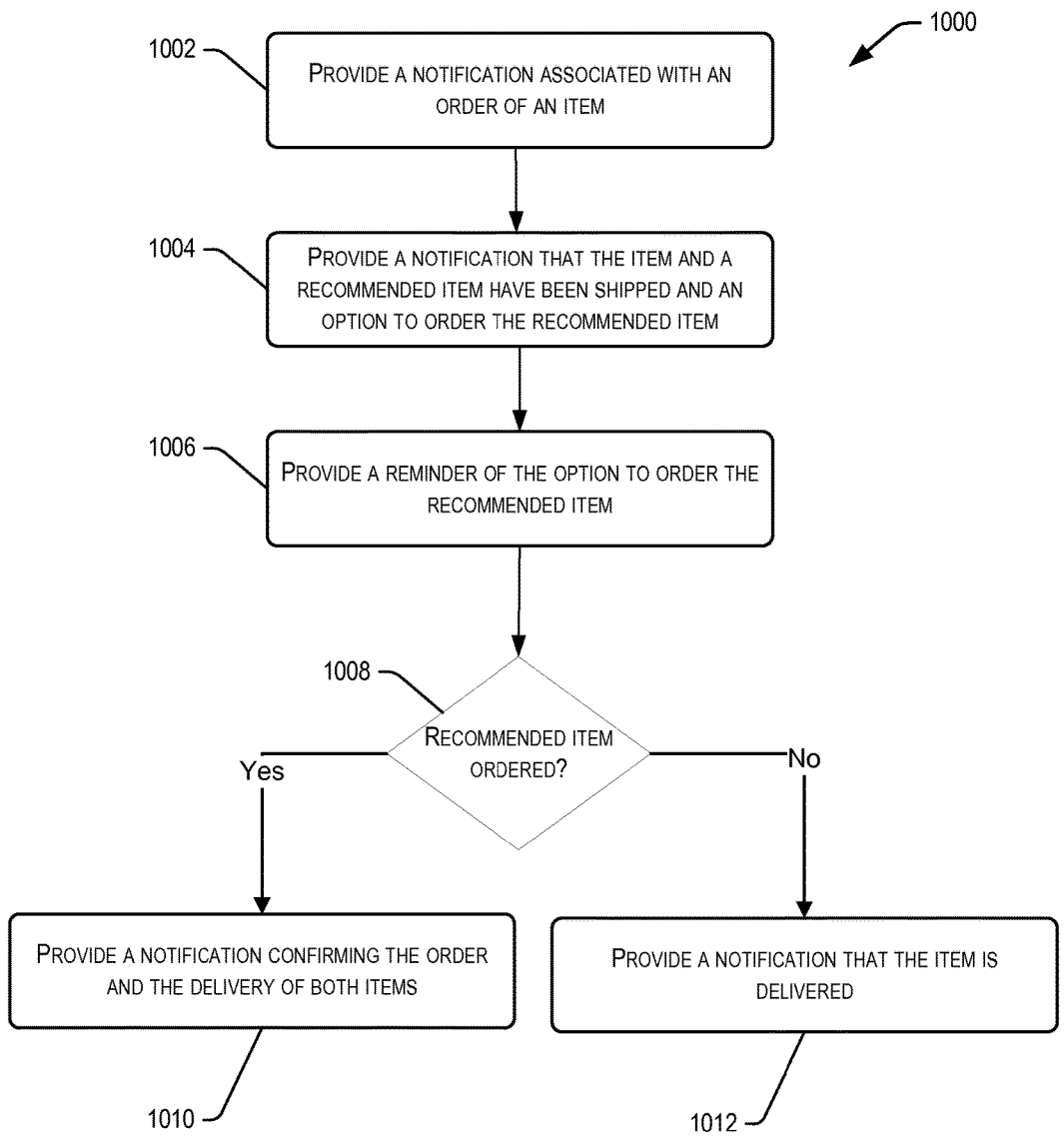
FIG. 10 illustrates an example flow for providing information about an ordered item and a recommended item, according to embodiments.

Turning to FIGS. 6-10, the figures illustrate example flows for providing an ordered item and a recommended item. In particular, FIG. 6 illustrates an example flow 600 for shipping an ordered item and a recommended item and delivering at least the ordered item. In comparison, FIG. 7 illustrates an example flow 700 for determining whether a recommended item may be shipped along with an ordered item. FIG. 8 illustrates an example flow 800 for identifying a recommended item for shipping. FIG. 9 illustrates an example flow 900 for deploying one or more UAVs to ship an ordered item and a recommended item. FIG. 10 illustrates an example flow 1000 for providing notifications to a user associated with an ordered item and a recommended item. Some operations across the example flows may be similar. Such similarities are not repeated herein in the interest of clarity of explanation.

In the illustrative operations, some of the operations or functions may be embodied in, and fully or partially automated by, components executed by one or more processors. For example, a delivery component hosted on one or more computing resources of a service provider may be configured to perform some or all of the operations. Nevertheless, other, or a combination of other, computing resources and components may be additionally or alternatively used. For example, a management component of a UAV may perform some or all of the operations based on whether the UAV may be configured for autonomous or semi-autonomous operations. Also, while the operations are illustrated in a particular order, it should be understood that no particular order is necessary and that one or more operations may be omitted, skipped, and/or reordered.

In the interest of clarity of explanation, the example flows of FIG. 6-10 illustrate two items available from an electronic marketplace: an ordered item and a recommended item. Nevertheless, the embodiments described herein are not limited as such. Instead, the example flows may similarly apply to a larger number and other types of items whether or not some or all of such items may be available from an electronic marketplace.

Turning to FIG. 6, the illustrated example flow 600 may start at operation 602, where an order for an item and a selection of a delivery method may be received. For example, items may be offered from an electronic marketplace. A user may operate a computing device to access the electronic marketplace over a network and order one of the available items. The user may also select one of various available delivery methods. The delivery method may specify a time frame to complete the delivery of the ordered item. This time frame may be short relative to time frames of the other available delivery methods. Accordingly, the selection of this faster delivery method may indicate a sense of urgency, need, importance, or eagerness of the user to receive the ordered item.

At operation 604, a recommended item may be determined based on the ordered item and the delivery method. For example, associations between the items available from the electronic marketplace may be maintained based on past item orders. The recommended item may be identified from candidate items based on a maintained association with the ordered item. Further, because of the selected delivery method (e.g., the shorter time frame), a determination may be made to ship the recommended item with the ordered item before notifying a user or receiving an order of the user for the recommended item. This determination may further apply a number of parameters to select the recommended item from the candidate items as described in FIG. 8.

At operation 606, the ordered item and the recommended item may be shipped using the delivery method. The shipment of both items may be initiated before notifying the user of the recommended item or before receiving a user order for the recommended item. In an example, one or more UAVs may be selected from a UAV fleet. Information or instructions about the delivery of the items may be provided to the UAV(s) based on the delivery method. The information or instructions may cause the UAV(s) to perform various autonomous or semi-autonomous operations to initiate the delivery of the items to a delivery location associated with the user.

At operation 608, a notification of the shipment with an option to order the recommended item may be provided. For example, the notification may be sent to a computing device of the user or may be pushed to an account of the user. The notification may be provided at various times and/or may originate from various sources. In one example, the notification may be sent from a computing system of the electronic marketplace shortly after the shipment may have been initiated. In another example, the notification may be sent from the UAV(s) during a flight or upon arrival to the delivery location.

At operation 610, a determination may be made as to whether the recommended item may have been ordered. This determination may be made before or after completion of the delivery of the ordered item. For example, during the flight of the UAV(s) to the delivery location, the user may order the recommended item based on the option provided in the notification. Information about this order may be provided to the UAV(s) causing the UAV(s) to also deliver the recommended item. In another example, the user's order may be received during a time frame after the delivery of the ordered item. This time frame may be relatively short and may correspond to, for instance, a time during which the UAV carrying the recommended item may still be located within the vicinity of the delivery location. In such a case, this UAV may return to the delivery location to deliver the recommended item. In both examples, if the recommended item is ordered, operation 612 may be performed to deliver both items. Otherwise, operation 614 may be performed.

At operation 612, the ordered item and the recommended item may be delivered. This delivery may be based on receiving the user's order for the recommended item. Additionally or alternatively, the delivery may be based on the capabilities of the UAV(s). For example, information or instructions may be provided to the UAV(s) to deliver both items based on the user's order for the recommended item. In another example, the UAV(s) may be pre-configured to deliver both items unless instructed otherwise. In yet another example, the UAV(s) may deliver both items. However, if the recommended item may not been ordered, a return process may be followed.

At operation 614, the ordered item may be delivered. For example, as part of deploying the UAV(s) or during deployment, the UAV carrying the ordered item may be configured on instructed to autonomously or semi-autonomously deliver the ordered item. Further, at this operation, the recommended item may or may not be delivered based on the deployment and/or the capabilities of the UAV(s). In an example, if separate UAVs are used to ship both items, the UAV carrying the recommended item may be instructed to stop the delivery. Alternatively, the default may be to avoid the delivery unless instructed otherwise. In another example, if a single UAV is used to deliver both item and if the used UAV is capable of selectively delivering the items, information or instructions may be provided to the UAV to not deliver the recommended item. Alternatively, the default may be not to deliver the recommended item unless instructed otherwise. Otherwise, the UAV may deliver both items and a process may be followed to return the recommended item. The return process may include, for example, using the same or different UAV to pick up the delivered, recommended item. In another example, the return process may include using a return package and other return methods.

In certain circumstances, shipping and delivering recommended items may represent a value-added service. However, in other circumstances, doing so may not be. Thus, a determination may be made as to whether to ship a recommended item prior to receiving an order of a user. This determination may be made as a part of processing a delivery request of the user for an ordered item. The flow 700 of FIG. 7 illustrates an example for making this determination.

In particular, the example flow 700 may start at operation 702, where a user ordering an item may be identified. For example, an identifier of the user's computing device may be used to identify the user. In another example, a user account or a login username may be used for the identification. Such information may be available as a part of the user ordering the item.

At operation 704, a delivery location associated with delivering the item may be determined. For example, the user may input an address as a part of completing a purchase of the item. In another example, the delivery location may be identified from the user account or estimated based on a location of the user's computing device.

At operation 706, a risk associated with shipping a recommended item may be quantified based on the user's identifier and/or the delivery location. This risk may represent a likelihood of receiving the user's order for the recommended item once the shipping may have commenced. In another example, the risk may represent a likelihood of losing the recommended item (e.g., the recommended item delivered, but a respective order not received beforehand or thereafter). Various techniques may be used to quantify the risk. In an example, parameters associated with the user's identifier and the delivery location may be weighed. For instance, an explicit selection or setting determined from the user's account indicating whether the user may prefer to receive the recommended item may be weighed heavier than other parameters. Further, a history of the user's past orders may be analyzed to determine an expected behavior of the user. For instance, if the history indicated that the user may likely order a recommended item, the risk may be adjusted accordingly. In addition, the delivery location may be mapped to a region. Expected behaviors of users within that region may be used to also adjust the risk.

In another example, a statistical approach may be implemented to quantify the risk and/or to select the recommended item. For example, a machine learning algorithm may be used. Historical data about past ordered of items may be inputted to the machine learning algorithm. The data may be limited to items that may have been recommended and subsequently ordered or declined. Further, the data may also be limited to the region of the delivery location. The machine learning algorithm may analyze the historical data and output one or more recommended items with likelihoods of being ordered.

At operation 708, a determination may be made as to whether the risk may be acceptable. For example, the risk may be compared to a threshold. The threshold may be defined based on various parameters and may vary between items and/or delivery regions. For example, the threshold may represent potential revenue generated from delivering a recommended item relative to the likelihood of losing the recommended item. If the risk exceeds this threshold, operation 710 may be performed where the recommended item and the ordered item may be shipped. Otherwise, operation 712 may be performed where only the ordered item may be shipped.

Based on receiving an order for an item and a selection of a delivery method, a recommended item may be selected for shipping to a delivery location along with the ordered item. The flow 800 of FIG. 8 illustrates an example flow for selecting the recommended item.

The example flow 800 may start at operation 802, where a plurality of recommendable items may be determined based on past item orders. For example, data associated with the past item orders may be maintained and may include identifiers of items ordered together. Based on a frequency of two items ordered together exceeding a predefined threshold, an association between the two items may be generated. The association may indicate that, when an order for one of the items may be received, the other item may also be recommended. As such, over time, different associations may be generated and maintained based on frequencies of joint item orders.

At operation 804, a filter associated with an item and a selected delivery method may be applied. The filter may use a set of parameters to identify a particular item of the plurality of recommendable items. This particular item may be set as a recommended item to be shipped along with the ordered item. In an example, the filtering may involve multiple stages. In one stage, a group of candidate items may be identified from the plurality of recommendable items based on the maintained associations. In another stage, one or more of the parameters may be used to select a particular item from the candidate items. Generally, the parameters may represent a set of constraints associated with shipping a recommended item along with the ordered item. The constraints may relate to the speed of the delivery method (e.g., an urgency of delivering the ordered item within a relatively shorter time frame). Accordingly, the different parameters may be applied to determine whether shipping a candidate item may meet the constraints. If so, the candidate may be set as the recommended item. Otherwise, the candidate item may be removed. If multiple candidate items meet the constraints, one or more of such candidate items may be recommended.

In an example, a filtering parameter may be associated with a candidate item. This filtering parameter may include at least one of the weight, dimension, shape, or volume of the candidate item. Generally, the easier and/or cheaper shipping the candidate item may be (e.g., smaller in size and/or weight), the more likely the candidate item may be set as the recommended item.

In another example, a filtering parameter may be associated with the ordered item. In particular, this filtering parameter may be used to compare attributes of the candidate and ordered items. If one or more complimentary attributes exist, the candidate item may be set as a recommended item. A complimentary attribute may indicate that the recommended item may be used in conjunction with the ordered item. For example, a mobile device cover case may be complimentary to a mobile device. In certain examples, this complimentary association may be directional based on potential usage and/or item value. For example, if the mobile device is ordered, the mobile device cover case may complement the usage of the mobile device. Thus, the mobile device cover case may be set as a recommended item. However, the converse may not be true. A mobile device may not be complimentary to a mobile device cover case and, thus, may not be recommended based on an order for the mobile device cover case.

In yet another example, a filtering parameter may be associated with an estimated value of shipping and delivering the candidate item as a recommended item. This filtering parameter may balance the cost of shipping, the potential cost of return, the potential cost of losing the recommended item, and revenue generated from ordering the recommended item. If the balance indicates a positive value, the candidate item may be set as the recommended item.

In a further example, a filtering parameter may be associated with the user. An analysis of past item orders of the user may indicate an expected user behavior. The candidate item may be set as the recommended item based on this expected user behavior. To illustrate, if the expected user behavior indicates that a likelihood of the user's order increases with a decrease of a price of an item, the cheaper the candidate item may be, the more likely the candidate item may be set as the recommended item. In another illustration, if past orders indicate that a user may have previously ordered the candidate item and that this item may currently need a replacement (e.g., expiring, or being used completely), the candidate item may be set as the recommended item.

In yet another example, a filtering parameter may be associated with a region containing the delivery location. In particular, if the candidate item represents an item popular to that region (e.g., one that may have been ordered and delivered to a plurality of delivery locations in that region), the candidate item may be set as a recommended item. Similarly, if a facility local to the region maintains the candidate item, the candidate item may be set as a recommended item.

In yet another example, a filtering parameter may be associated with an opportunity to ship a candidate item as a recommended item. For example, a UAV carrying the order item or another UAV within a region containing the delivery location (e.g., one being deployed to ship another item associated with a different user) may have available space. If the candidate item fits in that space (e.g., in dimension, shape, volume, or weight), the candidate item may be set as the recommended item.

In yet another example, a filtering parameter may be associated with a trend. In particular, certain candidate items may gain popularity based on a season, a promotion, a release, or other popularity drivers. For instance, certain drinks and snacks may become more popular around sport events. Thus, a candidate item may be recommended based on the respective trending popularity (e.g., a snack may be recommended around a sport event).

At operation 806, a recommended item may be selected from the group of candidate items based on the filtering. This selection may result in shipping the recommended item for delivery along with the ordered item. In an example, the selection may balance the one or more of the applied parameters to identify the candidate item (or a top number of candidate items) that may meet one or more of the constraints. For example, if a candidate item is more likely to be ordered and cheaper to ship relatively to another candidate item, the former candidate item may be selected as the recommended item. Further, an incentive may be provided (e.g., a discount on the price, free shipping, or some other incentive) may be associated with the recommended item. The incentive may increase a likelihood of the recommended item being ordered.

Once a recommended item may be selected, a determination may be made as to whether one or more UAVs may be used to deliver the recommended item and the respective ordered item. The flow 900 of FIG. 9 illustrates an example for making this determination.

The example flow 900 may start at operation 902, where a determination of whether to use more than one UAV may be made based on balancing a set of parameters to meet a set of constrains associated with shipping the recommended item and the ordered item. The set of parameters may be associated with the ordered item and the recommended, available UAVs, delivery locations, and/or facilities storing the items. If the balancing indicates that a certain number of UAVs may be used or may result in improved shipping, that certain number may be used.

In an example, a parameter associated with the ordered item and the recommended item may represent whether both items may be shipped together or not. For instance, if joint shipment may not be possible because of a combined weight or volume or because of potential resulting hazard, the shipment may use multiple UAVs.

In another example, a parameter associated with the available UAVs may indicate whether more than one UAV may be available. If another UAV is available (e.g., may have space to retain the recommended item and/or may be scheduled to execute a delivery mission within a region containing the delivery location), that UAV may be additionally used. As such, this parameter may reflect an opportunistic approach that may consider shipping opportunities using other UAVs. Doing so may optimize usage of the UAV fleet (e.g., by increasing or maximizing usage of the available shipping space).

In a further example, a parameter associated with the delivery locations may also represent an opportunistic approach to increase the delivery throughput. In other words, the delivery locations may be associated with a region. A portion or all of the UAV fleet may be managed to serve that region. If other deliveries may be occurring within that region, available space on delivering UAVs may be assessed. The ordered item and the recommended item may be allocated to different UAVs if doing so may increase the total number of deliverable items within that region.

In yet another example, a parameter associated with the facilities may indicate whether the recommended item and/or the ordered item may be available for shipment from a same facility, from different facilities, and/or whether the facilty(ies) may be local to the region. If from different facilities, the items may be shipped separately (e.g., using different UAVs). If a facility is local, a UAV from a UAV fleet local that region may be used.

At operation 904, a selection of one or more UAVs may be made based on the determination. In particular, if one UAV may be used, operations 906 and 908 may be performed. Otherwise, operations 910 and 912 may be performed. The selection of the UAV(s) may consider the capabilities of the UAV(s) and the delivery time(s) of the items. For example, if one UAV is to be used, that UAV may be selected from a UAV fleet as one capable of retaining and delivering both items within a time frame of a selected delivery method. In another example, if a plurality of UAVs is used, these UAVs may be selected from the UAV fleet as ones capable of retaining and delivering the respective items within respective time frames.

At operation 906, the selected UAV may be deployed. The UAV may retain both items. For example, information or instructions about the delivery location and the delivery time frame may be provided to the UAV causing the UAV to fly to the delivery location.

At operation 908, the UAV may be instructed to perform a delivery maneuver. For example, the information provided to the UAV as a part of the deployment (e.g., initially, during the flight, or upon arrival to the delivery location) may indicate whether to deliver both items, whether to deliver the ordered item only if not instructed otherwise, and/or whether to pick up the recommended item after delivery.

In comparison, at operation 910, more than one UAV may be deployed. While one UAV may retain the ordered item, another UAV may retain the recommended item. In such a case, both UAVs may be scheduled to arrive to the delivery location and potentially deliver the items within a short time frame of each other. For example, the UAV retaining the ordered item may be scheduled to complete the delivery within the time frame of the selected delivery method. The other UAV may be scheduled to deliver the recommended item before, substantially at the same time, or within a short time frame after the delivery of the ordered item.

At operation 912, the UAV retaining the recommended item may be instructed to perform a delivery maneuver. For example, information may be provided to this UAV as a part of the deployment (e.g., initially, during the flight, or upon arrival to the delivery location). This information may indicate whether to deliver the recommended item or to avoid the delivery.

The recommended item may be shipped along with the ordered item prior to receiving an order of the user for the recommended item. Once such an order is received, the recommended item may be delivered to the user and/or the user may be charged for the recommended item. This approach may improve the user's experience. In particular, because the selected delivery method may indicate urgency in receiving the ordered item within a time frame, delivering a recommended item substantially within that time frame may help satisfy other reasons (e.g., user's needs) associated with this urgency. The effectiveness of this approach may, however, depend on notifying the user of the recommended item. The flow 1000 of FIG. 10 illustrates an example for notifying the user.

The example flow 1000 may start at operation 1002, where a notification associated with an order of an item may be provided. For example, an interface may be provided to the user's computing device and may include information about the ordered item and the expected delivery time frame.

At operation 1004, a notification that the ordered item and a recommended item have been shipped and an option to order the recommended item may be provided. For example, information about the shipment and the option may be sent to the user's computing device, thereby notifying the user of the shipment and the option.

At operation 1006, a reminder of the option to order the recommended item may be provided. For example, information about the option may be sent again to the user's computing device to accordingly notify the user. This information may be sent at time intervals, based on a trigger event (e.g. upon arrival of a UAV retaining the recommended item to a respective delivery location), and/or based on a setting configured at the user's account.

At operation 1008, a determination may be made as to whether the recommended item may have been ordered. If so, operation 1010 may be performed. Otherwise, operation 1012 may be performed.

At operation 1010, if the recommended item is ordered, a notification may be provided confirming such an order. This notification may also inform the user about an expected delivery of the recommended item and/or about an actual delivery of both the ordered and recommended items.

In comparison, at operation 1012, a notification may be provided indicating the delivery of the ordered item. For example, this notification may inform the user that the recommended item may not have been delivered, or if delivered, about ways to return the recommended item. The notification may also inform the user that the user's account may not have been charged for the recommended item.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system associated with an electronic marketplace from a user computing device, an order for a requested item offered from the electronic marketplace and a selection of a delivery method from available delivery methods to a requested location, the delivery method based at least in part on using an unmanned aerial vehicle (UAV) to deliver the requested item to the requested location within a shorter predefined time frame relative to a predefined time frame of another one of the available delivery methods;
in response to the selection of the delivery method that has the shorter predefined time frame, determining, by the computer system, a recommended item based at least in part on a comparison of an attribute of the recommended item and an attribute of the requested item and on an available UAV delivery space;
causing, by the computer system, one or more UAVs to deploy to the requested location based at least in part on the order for the requested item and on the selection of the delivery method and absent of an order for the recommended item, the one or more UAVs retaining at least the requested item and the recommended item;
based at least in part on deploying the one or more UAVs, sending, by the computer system to the user computing device, a notification that the requested item and the recommended item have been shipped and an option to order the recommended item; and
causing, by the computer system, the one or more UAVs to deliver the requested item to the requested location based at least in part on the order and to deliver the recommended item to the requested location based at least in part on receiving a selection of the option to order the recommended item.

2. The computer-implemented method of claim 1, wherein the requested item and the recommended item are separately retained by a single UAV, and wherein causing the one or more UAVs to deliver the recommended item comprises providing data to the single UAV based at least in part on the selection of the option to order the recommended item, wherein the data causes the single UAV to activate a retaining system to deliver the recommended item.

3. The computer-implemented method of claim 1, wherein the one or more UAVs comprises a first UAV retaining the requested item and a second UAV retaining the recommended item, and wherein causing the one or more UAVs to deploy to the requested location comprises scheduling the first UAV and the second UAV to arrive at the requested location within the shorter predefined time frame.

4. The computer-implemented method of claim 3, wherein the first UAV is deployed from a first facility storing the requested item, wherein the second UAV is deployed from a second facility storing the recommended item, and wherein the second facility is configured to store a plurality of recommendable items based at least in part on the requested location.

5. One or more non-transitory computer-readable media comprising instructions that, when executed with one or more processors, cause a computing system to perform operations comprising at least:
- receiving, from a computing device, a request for a delivery of an item to a delivery location, the request identifying a delivery method from available delivery methods, the delivery method based at least in part on using an unmanned vehicle to deliver the item to the delivery location within a shorter time frame relative to a time frame of another one of the available delivery methods;
- in response to the request identifying the delivery method that has the shorter time frame, determining an additional item based at least in part on a comparison of an attribute of the additional item and an attribute of the item and on an available unmanned vehicle delivery space;
- scheduling the item and the additional item to be delivered based at least in part on the shorter time frame, wherein the scheduling comprises causing one or more unmanned vehicles to deploy to the delivery location based at least in part on the request for the delivery of the item and on the delivery method and absent of a request from the computing device for the additional item, the one or more unmanned vehicles retaining at least the item and the additional item;
- providing, to the computing device, information associated with the item and the additional item, the information comprising an option to accept a delivery of the additional item based at least in part on the scheduling;
- receiving, from the computing device, a selection of the option;
- causing the one or more unmanned vehicles to deliver the item based at least in part on the request for the item; and
- causing the one or more unmanned vehicles to deliver the additional item based at least on the selection of the option.

6. The one or more non-transitory computer-readable media of claim 5, wherein the delivery of the item uses at least an unmanned aerial vehicle, and wherein the item and the additional item are available for ordering from an electronic marketplace.

7. The one or more non-transitory computer-readable media of claim 5, wherein the instructions that, when executed with the one or more processors, cause the computing system to perform further operations comprising:
- determining that the additional item is to be scheduled for delivery prior to receiving the request for the additional item based at least in part on one or more of: a history of past orders in a user account or a history of deliveries of additional items to a region associated with the requested delivery location.

8. The one or more non-transitory computer-readable media of claim 5, wherein the additional item is determined based at least in on an analysis of past orders of the item, and wherein the analysis indicates that the item and the additional item were ordered together at a frequency exceeding a threshold.

9. The one or more non-transitory computer-readable media of claim 5, wherein the additional item is determined based at least in part on having at least one complementary attribute relative to the item and based at least in part on the shorter time frame indicating an urgency of delivering the item.

10. The one or more non-transitory computer-readable media of claim 5, wherein determining the additional item comprises selecting the item from a plurality of additional items determined based at least in part on the item, and wherein the selecting is based at least in part on one or more of: a weight of the additional item, a volume of the additional item, or a value of the additional item.

11. The one or more non-transitory computer-readable media of claim 5, wherein the request is associated with a user account, wherein the additional item is further determined based at least in part on a past order of the user account for the additional item, and wherein the past order indicates a need for the additional item.

12. The one or more non-transitory computer-readable media of claim 5, wherein providing the information comprises transmitting, prior to receiving the selection of the option, a notification about shipment of the item and the additional item and about an incentive to select the option.

13. A system comprising:
- one or more processors; and
- one or more non-transitory computer-readable media comprising instructions that, when executed with the one or more processors, cause the system to at least:
  - receive, from a computing device, a request to deliver an item to a delivery location, the item offered from a network-based resource, the request identifying a delivery method from available delivery methods, the delivery method based at least in part on using an unmanned vehicle to deliver the item to the delivery location within a shorter time frame relative to a time frame of another one of the available delivery methods;
  - in response to the request identifying the delivery method that has the shorter time frame, determine an additional item based at least in part on a comparison of an attribute of the additional item and an attribute of the item and on an available unmanned vehicle delivery space, the additional item available for ordering from the network-based resource;
  - cause a delivery of the item and of the additional item to be initiated based at least in part on the shorter time frame, the delivery initiated by at least deploying one or more unmanned vehicles to the delivery location based at least in part on the request to deliver the item and on the delivery method and absent of a request for the additional item, the one or more unmanned vehicles retaining at least the item and the additional item;
  - provide, to the computing device, information about the initiated delivery, the information comprising an option to order the additional item;
  - cause the one or more unmanned vehicles to deliver the item within the shorter time frame based at least in part on the request to deliver the item; and
  - cause the one or more unmanned vehicles to deliver the additional item based at least in on part on receiving a selection of the option.

14. The system of claim 13, wherein causing the delivery to be initiated comprises, prior to receiving the selection of the option, providing instructions to a deployment system to select the unmanned vehicle and retain the item and the additional item in the unmanned vehicle.

15. The system of claim 13, wherein the request is associated with a delivery location, wherein the item is stored at a facility, wherein the additional item is stored at another facility closer to the delivery location than the facility, and wherein the additional item is further determined based at least in part on being stored at the another facility.

16. The system of claim 13, wherein causing the delivery to be initiated comprises:
   providing instructions to a deployment system to retain the item in the unmanned vehicle and to deploy the unmanned vehicle to the delivery location based at least in part on the shorter time frame;
   determining that another deployed unmanned vehicle retains the additional item and is available to arrive to the delivery location within the shorter time frame; and
   providing instructions to the deployment system to direct the another deployed unmanned vehicle to the delivery location.

17. The system of claim 13, wherein causing the delivery to be initiated comprises:
   providing instructions to a deployment system to retain the item in the unmanned vehicle and to deploy the unmanned vehicle based at least in part on the shorter time frame;
   determining that another unmanned vehicle associated with another request to deliver another item comprises available space to retain the additional item and is available to arrive to the delivery location within the shorter time frame; and
   providing instructions to the deployment system to retain the additional item in the another unmanned vehicle and to deploy the another unmanned vehicle based at least in part on the shorter time frame.

18. The system of claim 13, wherein causing the delivery to be initiated comprises:
   causing the unmanned vehicle to retain the additional item, and wherein causing the delivery of the additional item comprises transmitting information about the selection of the option to the unmanned vehicle, the information causing the unmanned vehicle to deliver the additional item.

19. The system of claim 13, wherein the request to deliver the item is associated with a user account, and wherein causing the delivery to be initiated comprises:
   causing the unmanned vehicle to retain the additional item, and wherein the selection of the option is received based at least in part on a point-to-point communication between a computing device of the user and the unmanned vehicle.

20. The computer-implemented method of claim 1, wherein the requested item and the recommended item are separately retained by a retaining system of a single UAV, and wherein causing the one or more UAVs to deliver the recommended item comprises:
   providing instructions to the single UAV to deliver the requested item based at least in part on the order for the requested item and to deliver the recommended item based at least in part on the selection of the option to order the recommended item, the instructions activating the retaining system to deliver the requested item and the recommended item separately from each other.

* * * * *